Aug. 3, 1937.  C. P. STOCKER  2,088,621
ELECTRICAL SYSTEM
Filed Oct. 19, 1936  2 Sheets-Sheet 1
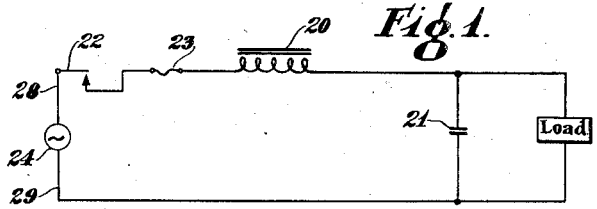
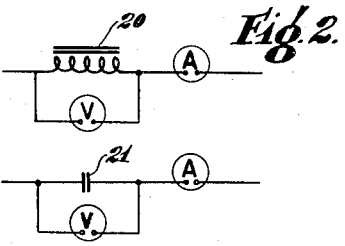
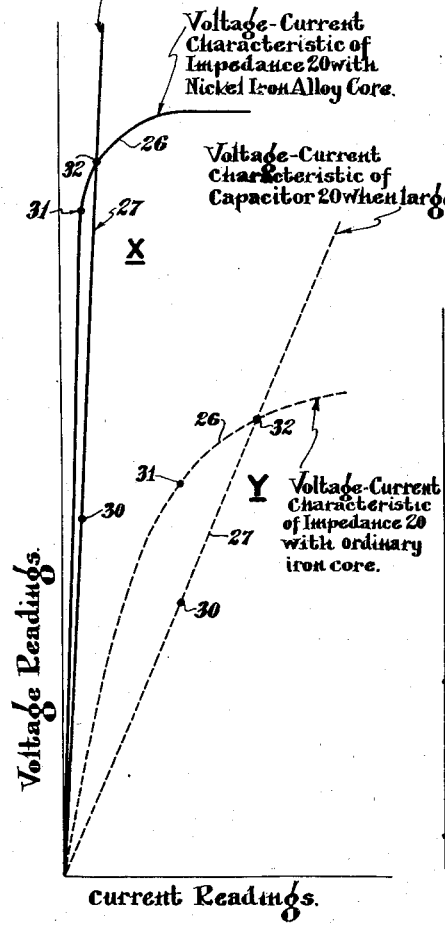
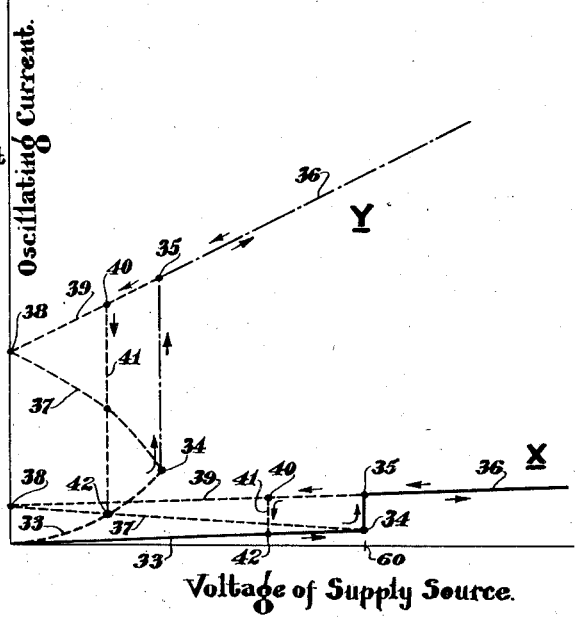
INVENTOR.
*Closman P. Stocker*
BY
*Woodling and Krost*
ATTORNEY.

Aug. 3, 1937.                C. P. STOCKER                2,088,621
                           ELECTRICAL SYSTEM
                         Filed Oct. 19, 1936          2 Sheets—Sheet 2
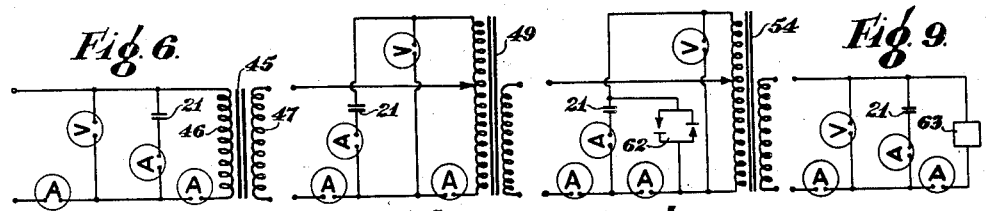

Patented Aug. 3, 1937

2,088,621

UNITED STATES PATENT OFFICE 2,088,621

ELECTRICAL SYSTEM

Closman P. Stocker, Lorain, Ohio, assignor of one-half to E. M. Heavens, Elyria, Ohio Application October 19, 1936, Serial No. 106,356

16 Claims. (Cl. 171—119)

My invention relates generally to electrical systems, and more particularly to a system adapted to be energized by an alternating current variable voltage supply source and arranged to deliver a substantially constant output voltage for relatively wide variations of the voltage of the supply source.

An object of my invention is the provision of an oscillating circuit adapted to be energized by an alternating current variable voltage supply source and arranged to resonate at substantially the same frequency as the frequency of the supply source, taken in combination with a stabilizing means shunting a portion of said oscillating circuit to by-pass a portion of the said oscillating current to limit and stabilize the voltage across the said shunted portion of the oscillating circuit.

A further object of my invention is the provision of an oscillating circuit including a non-linear impedance and a capacitor adapted to be energized by an alternating current variable voltage supply source and arranged to resonate at substantially the same frequency as the frequency of the supply source, taken in combination with stabilizing means shunting the capacitor to by-pass a portion of the oscillating current around the capacitor to limit and stabilize the voltage across the said capacitor.

A still further object of my invention is the provision of a stabilizing impedance means shunting the capacitor to by-pass a portion of the oscillating current around the capacitor, the said stabilizing impedance means having a decreasing inductance as the by-pass current rises above a certain value to limit and stabilize the voltage across the capacitor.

It is also an object of my invention to provide a stabilizing means for shunting the capacitor to by-pass a portion of the oscillating current around the capacitor, said stabilizing means comprising a material having a non-linear voltage-current characteristic such that, as the voltage across the capacitor increases, a greater proportion of the current passes through the stabilizing means to limit and stabilize the voltage across the capacitor.

A further object of my invention is the provision of a stabilizing non-linear rectifier means shunting the capacitor to by-pass a portion of the oscillating current around the capacitor to limit and stabilize the voltage across the said capacitor.

A still further object of my invention is the provision of a stabilizing transformer means shunting the capacitor and by-passing a portion of the oscillating current around the capacitor, said stabilizing transformer means having a decreasing inductance as the by-pass current rises above a certain value to limit and stabilize the voltage across the capacitor.

A still further object of my invention is the provision of a stabilizing transformer means shunting the capacitor and charging the capacitor at a higher voltage than the voltage of the said supply source to increase the effective capacity of the capacitor, the said stabilizing transformer means by-passing a portion of the oscillating current around the capacitor and having a decreasing inductance as the by-passed current rises above a certain value to limit and stabilize the voltage across the capacitor.

Another object of my invention is the provision of an oscillating circuit including a non-linear impedance and a capacitor adapted to be energized by an alternating current variable voltage supply source and arranged to resonate at substantially the same frequency as the frequency on the supply source, and arranged to deliver a substantially constant output voltage for relatively wide variations of the voltage of the supply source.

Another object of my invention is the provision of a transformer energized by an oscillating circuit adapted to resonate at substantially the same frequency as the frequency of the supply source, the transformer having an output winding to deliver a substantially constant output voltage for relatively wide variations of the voltage of the supply source.

Another object of my invention is the provision of utilizing an oscillating circuit having a "jumping" phenomena for energizing a transformer having an output winding to deliver a substantially constant output voltage for relatively wide variations of the voltage of the supply source.

Another object of my invention is the provision of a load capacitor associated with the load circuit to maintain the voltage across the load circuit substantially constant with a varying load.

Another object of my invention is the provision of an oscillating circuit having a non-linear inductance element and a non-linear effective capacity.

Another object of my invention is the provision of an oscillating circuit having a non-linear inductance element with a nickel-iron alloy core or a "permalloy" core.

Another object of my invention is the provision of an oscillating circuit having a non-linear inductance element and a capacitor, wherein the non-linear inductance element and the capacitor are so proportional that the value of the oscillating current and the voltage across the capacitor are substantially constant for relative wide variations of the voltage of the supply source which energizes the said oscillating current.

Another object of my invention is the provision of dampening parasitic current which may flow around the circuit formed by the stabilizing means and the capacitor of my oscillating circuit.

Other objects and a fuller understanding of my invention may be had by referring to the following description and claims, taken in conjunction with the accompanying drawings, in which like parts are designated by like reference characters, and in which:

Figure 1 illustrates an oscillating circuit including a non-linear impedance and a capacitor adapted to be energized by an alternating current variable voltage supply source and arranged to resonate at substantially the same frequency as the frequency of the supply source and adapted to deliver a substantially constant output voltage to the load for relatively wide variations of the voltage of the supply source.

Figure 2 illustrates a non-linear impedance or inductance element shown in Figure 1 connected with an ammeter and a voltmeter to determine the non-linear voltage-current characteristic of the said impedance or inductance element.

Figure 3 illustrates the capacitor of the oscillating circuit in Figure 1 taken in connection with an ammeter and a voltmeter to determine the voltage-current characteristic of the said capacitor.

Figure 4 illustrates two families of curves, one family showing the voltage-current characteristic of the non-linear inductance with a nickel-iron alloy core or a "permalloy" core and the capacitor when small, and the other family showing the voltage-current characteristic of the non-linear inductance with an ordinary iron core and the capacitor.

Figure 5 illustrates respectively two families of curves showing the "jumping" phenomena of the oscillating circuit under the two conditions illustrated in Figure 4.

Figure 6 illustrates the capacitor shunted by a stabilizing transformer connected with ammeters and a voltmeter to determine the non-linear effective capacity of the capacitor.

Figure 7 illustrates the capacitor shunted by a stabilizing step-up transformer connected with ammeters and a voltmeter to determine the non-linear effective capacity of the capacitor.

Figure 8 illustrates the capacitor shunted by a stabilizing copper-oxide rectifier means connected with ammeters and a voltmeter to determine the non-linear effective capacity of the capacitor.

Figure 9 illustrates the capacitor shunted by a stabilizing means comprising a material having a non-linear voltage-current characteristic connected with ammeter and a voltmeter to determine the non-linear effective capacity of the capacitor.

Figure 10 illustrates curves showing the voltage-current characteristics of the non-linear impedance, the capacitor, the stabilizing means, and the non-linear effective capacity of the capacitor.

Figure 11 illustrates the "jumping" phenomena of my oscillating circuit taken in combination with stabilizing means.

Figure 12 illustrates an oscillating circuit taken in combination with the stabilizing transformer shown in Figure 6 having the input winding connected to the oscillating circuit and the output winding connected to a load.

Figure 13 shows an oscillating circuit taken in combination with the stabilizing transformer shown in Figure 7 for increasing the effective capacity of the capacitor.

Figure 14 shows an oscillating circuit taken in combination with the stabilizing arrangement of the non-linear copper-oxide rectifier shown in Figure 8.

Figure 15 illustrates an oscillating circuit taken in combination with the stabilizing means shown in Figure 9 comprising material having a non-linear voltage-current characteristic.

With reference to the drawings, my oscillating circuit comprises a non-linear impedance or inductance element 20 and a capacitor 21 arranged to be connected in circuit relation with an alternating current supply source 24 by means of the terminal leads 28 and 29, and a switch 22. A fuse 23 may be provided to protect the circuit from overload. In this embodiment of my invention, the non-linear impedance or inductance element 20 and the capacitor 21 are arranged to resonate at substantially the same frequency as the frequency of the supply source. In my oscillating circuit a "jumping" phenomena of the oscillating current takes place by reason of the fact that the iron core of the non-linear impedance or inductance element 20 saturates when the voltage of the supply source reaches a certain value.

The "jumping" phenomena of the oscillating circuit may be described with reference to Figures 4 and 5, which illustrate respectively two families of curves X and Y. The non-linear voltage-current characteristic of the impedance 20 with a nickel-iron alloy core or a "permalloy" core is illustrated by the curve 26 of family X of Figure 4. The non-linear voltage-current characteristic of the impedance 20 with an ordinary iron core is illustrated by the curve 26 of family X. The curve 26 of family X is determined by passing a current through the impedance 20 with a nickel-iron alloy core or "permalloy" core and taking simultaneously the current reading by the illustrated ammeter and the voltage reading by the illustrated voltmeter of Figure 2. The curve 26 of family Y is determined in the same manner, except that in this case the impedance 20 has an ordinary iron core. By varying the value of the current flowing through the impedance 20 with each type of iron core, a double set of values may be obtained for plotting respectively the curve 26 of families X and Y of Figure 4.

The voltage-current characteristic of the capacitor 21 is obtained in a similar manner, see Figure 3, and is represented by the line 27 of family X in Figure 4 when the capacity is small, and by the line 27 of family Y when the capacity is large. The double set of voltage-current values for determining respectively the line 27 of families X and Y may be obtained by passing a variable current through the capacitor 21 of a small size and then of a large size and taking simultaneously the ammeter and voltmeter reading for each individual size of the capacitor. As is observed in Figure 4, the voltage-current characteristic of the impedance 20 is non-linear and the voltage-current characteristic of the capacitor is straight. The vertical distance between the points 30 and 75

31 on the curves of family X and of the family Y respectively of Figure 4 represents the maximum difference between the voltage across the impedance 20 and the voltage across the capacitor 21 for each set of the impedance and the capacitor. The point 32 represents the value where the two curves of each family cross each other, and being the condition where the voltage across the capacitor equals the voltage across the impedance. For current values beyond the point 32, the voltage across the capacitor 21 increases more rapidly than the voltage across the impedance 20.

The Figure 5 illustrates two families of curves X and Y showing the "jumping" phenomena of the oscillating circuit resulting from the saturation of the core of the impedance 20, and are based respectively upon the voltage-current characteristic of the two families of curves X and Y for the impedance 20 and the capacitor 21 as shown in Figure 4. In Figure 5, the abscissa designates the terminal voltage across both the impedance 20 and the capacitor 21 of the oscillating circuit, and the ordinate represents the current flowing through the oscillating circuit. Let it be supposed in Figure 1 that the impedance 20 has a nickel-iron alloy core or a "permalloy" core and that the switch 22 is closed and the voltage of the alternating current supply source 24 is gradually increased from zero to a higher value. As the voltage is increased, the current flowing through the oscillating circuit will gradually rise as indicated by the line 33 of family X in Figure 5. As illustrated, the current gradually increases until it reaches the point 34. Up to the point 34, the current gradually rises, because under this condition the value of the voltage causing the current to flow in the oscillating circuit gradually increases, as represented by the vertical distance between the voltage-current characteristic of the impedance 20 and the voltage-current characteristic of the capacitor 21 in family X, in Figure 4, until the points 30 and 31 are reached. In other words, the value of the current flowing through the oscillating circuit at the point 34 in family X of Figure 5 is determined by the difference in voltage between the points 30 and 31 in family X of Figure 4; that is, the maximum difference between the voltage across the impedance 20 and the voltage across the capacitor 21. For current values in Figure 4 beyond the points 30 and 31 up until the point 32, the difference in voltage across the impedance 20 and the capacitor 21 gradually decreases and this causes the "jumping" phenomena of the oscillating circuit. In other words, the "jumping" phenomena is caused by the saturation of the core of the impedance 20.

Referring again to the family X of Figure 5, when the terminal voltage of the supply source is increased to a point 60 which is the value where the current flowing through the oscillating circuit reaches the point 34, the current as manifested by an ammeter connected in the oscillating circuit, immediately "jumps" to the point 35. As the voltage of the supply source is increased beyond the point 60, the current of the oscillating circuit remains substantially the same, as indicated by the substantially horizontal line 36. While an ammeter of the oscillating circuit would indicate that the current "jumps" from the point 34 to the point 35, yet theoretically the current follows the dotted lines 37 and 39 when increasing from the point 34 to the point 35. The rise in the current designated by the dotted line 37 results from the fact that in family X of Figure 4, the difference in the voltage across the impedance 20 and across the capacitor 21 above the points 30 and 31 up to the point 32 gradually decreases to zero where the two curves cross each other. Thus, the value of the current flowing through the oscillating circuit at the point 38 in family X of Figure 5, occurs at the instant the two curves 26 and 27 cross at the point 32 in family X of Figure 4. Beyond this point 38, the current rises slowly, a very small value, along the line 39 up to the point 35, where it will keep on slowly rising along the line 36 as the voltage of the supply source increases beyond the point 60.

Let it be assumed that the current has slightly increased beyond the point 35 along the line 36 and that the terminal voltage of the supply source is now gradually reduced. Under this condition, the current of the oscillating circuit gradually decreases as indicated by the arrow line along the line 36 to and beyond the point 35 to a point 40. At the point 40, the oscillating current abruptly decreases along the dotted line 41 to a point 42 upon the line 33. If the terminal voltage of the supply source were again increased, the current would again rise and reach the point 34, where the "jumping" phenomena occurs. This cycle of the current of the oscillating circuit abruptly falling and rising is illustrated by the path of the arrows in family X of Figure 5.

In Figure 5, it is noted that the line 37 has a negative slope, which means that there is theoretically a negative resistance present in the oscillating circuit when the "jumping" phenomena occurs. As a result power is generated in the oscillating circuit, thus starting oscillations when the voltage of the supply source increases to or beyond the point 60 and sustaining the oscillations so long as the supply voltage remains above the value where the current is beyond the point 42. After the "jumping" phenomena occurs, the variations of the supply voltage becomes substantially ineffective in causing corresponding variations in the oscillating current.

The value of the voltage of the supply source at which the "jumping" phenomena occurs may be varied by varying the impedance 20 or the capacitor 21, or by varying both. In the embodiment of my invention in Figure 1, the impedance 20 and the capacitor 21 of the oscillating circuit are so proportioned that the voltage at which the "jumping" phenomena occurs is below the minimum voltage variation of the supply source. Thus, for illustration, if the minimum voltage of the ordinary 110 volt supply source should ever drop as low as 70 volts, the voltage at which the "jumping" phenomena occurs would be slightly below 70 volts. This means that for any voltage fluctuations from 70 volts as a minimum to 140 volts or more as a maximum, the value of the current flowing in the oscillating circuit would follow the substantially horizontal line 36. This means that the value of the oscillating current which flows in my oscillating circuit in Figure 1 when the impedance 20 has a nickel-iron alloy core or "permalloy" core, is substantially constant for very wide fluctuations of the voltage of the supply source 24. As a result, the voltage across the capacitor and the load is likewise maintained substantially constant for very wide fluctuations of the voltage of the supply source 24. As explained with reference to the family of curves X in Figures 4 and 5, this stability of the voltage across the capacitor 21 and the load in the circuit of Figure 1, is attained by so proportioning the non-linear impedance or inductance element 20 and the capacitor 21 that the value of the oscillating current, after the "jumping" phenomena occurs, remains substantially constant, see line 36, for a relative increase of the supply voltage above the point 60.

The high degree to which the current flowing in my oscillating circuit, and to which the voltage across the capacitor 21, in Figure 1, is stabilized, when the impedance 20 and the capacitor 21 have voltage-current characteristics as shown in family X of Figure 4, may be realized more clearly by a comparison to the family of curves Y of Figures 4 and 5, wherein like reference characters represent corresponding points to those in the family of curves X. The curves in family Y, are based upon the saturation of the impedance 20 with an ordinary iron core and upon the capacitor 21 increased in size. As illustrated in family Y of Figure 5, the "jumping" phenomena occurs at a lower voltage of the supply source than in family X. This is because in Figure 4, the vertical distance between the points 30 and 31 in family Y is less than the vertical distance between the points 30 and 31 in family X. The height of the "jump" is more in family Y than in family X, because the impedance to the flow of the current in the oscillating circuit is less under conditions of Y than under conditions of X. Also the value of the oscillating current under conditions of Y, after the "jumping" phenomena occurs, rises more rapidly than it does under conditions of X. This is clearly shown by comparing the slope of the line 36 of family X with the slope of the line 36 of family X. In other words, the current flowing in the oscillating circuit and the voltage across the capacitor 21 of Figure 1, under conditions of Y are not so stable as they are under conditions of X. While the stability is greater under conditions of X, the output to the load is smaller. For this reason, the applications of the oscillating circuits under conditions of X may be limited to small constant loads where it is desirable to maintain a substantially constant output voltage for relative wide fluctuations of the voltage of the supply source.

In order to increase the load capacity of my oscillating circuit to supply a relatively large load and at the same time maintain stability of the output voltage for relatively wide fluctuations of the voltage of the supply source, I employ a suitable stabilizing means with my oscillating circuit having the impedance 20 provided with an ordinary iron core and having the capacitor 21 of an increased size. These conditions of the oscillating circuit are representative of the condition under Y. In other words, I employ an oscillating circuit which gives a relatively large output but which the oscillating current and the voltage across the capacitor is not stable under relatively wide fluctuations of the voltage of the supply source, and then I stabilize the oscillating current, and the voltage across the capacitor by means of a stabilizer which gives a substantial constant output voltage for relatively wide fluctuations of the voltage of the supply source. In the embodiment of my invention, I may utilize any one of several stabilizing means. In Figures 6 and 12, the stabilizing means takes the form of a stabilizing transformer 45 having an input winding 46 connected across the capacitor 21 and having an output winding 47 connected to the load. In accordance with the principles embodied in the stabilizing means shown in Figures 6 and 12, the magnetic core of the stabilizing transformer 45 is normally operated near the knee of the saturation curve. During the stabilizing action of the transformer 45, it functions to by-pass a portion of the oscillating current from the capacitor 21, inasmuch as the magnetic core of the transformer core 45 is normally operated near the knee of the saturation curve, it has a decreasing inductance as the by-passed current rises above a certain value and this functions to limit and stabilize the voltage across the capacitor 21.

The voltage-current characteristic of the non-linear impedance 20 of the oscillating circuit shown in Figure 12 is obtained in the same manner as that described with reference to Figure 2 of the drawings, in that simultaneous readings of the current and voltage are taken by the illustrated ammeter and voltmeter in Figure 2, as the current flowing through the impedance 20 is varied. The non-linear voltage-current characteristic of the impedance 20 of the oscillating circuit of Figure 12 is indicated by the reference character 26 of Figure 10. The voltage-current characteristic of the capacitor 21 and the stabilizing transformer 45 in the oscillating circuit of Figure 12 may be obtained by taking simultaneously readings of the ammeters and the voltmeter in the arrangements shown in Figure 6. The voltage-current characteristics of the capacitor 21 is indicated by the line 27 and the current and the voltage values for determining this line may be obtained by taking the simultaneous readings of the voltmeter and the ammeter that is connected in series with the capacitor 21 in Figure 6, as the current flowing through the capacitor 21 is varied. The voltage-current characteristics of the impedance 20 and the capacitor 21 of Figure 10 are representative of those shown in family Y of Figure 4, and are indicated by like reference characters. The voltage-current characteristic of the impedance for the transformer 45 shunting the capacitor 21 is indicated by the line 25 in Figure 10 and the values of the current and voltage for determining the line 25 is obtained by taking simultaneous readings of the voltmeter and the ammeter that is connected in series with the winding 46 of the transformer 45. Although the by-pass current through the stabilizing impedance of the transformer 45 is read as a positive value on the ammeter, the curve 25 is drawn in Figure 10 with negative current values, because it represents the fact that the current is by-passed around the capacitor 21. The voltage-current characteristic of the capacitor 21 when shunted by the impedance of the transformer 45 is indicated by the curve 27a in Figure 10 and the current and voltage values for determining this curve 27a may be obtained by taking simultaneous readings of the voltmeter and ammeter which reads the current flowing through both the capacitor 21 and the winding 46 of the transformer 45. In Figure 10, the voltage current characteristic of the capacitor 21, when shunted by the stabilizing impedance, is made up by adding the horizontal current values of the curve 27 to the horizontal current values of the curve 25, expressed positively. Thus, the line 27a may be characterized as a non-linear effective capacitive curve. Accordingly, the operating elements of the oscillating circuit shown in Figure 12 comprises a non-linear inductance as represented by the inductance 20 and a non-linear effective capacity as represented by the capacitor 21 when shunted by the stabilizing impedance.

The "jumping" phenomena of the oscillating circuit shown in Figure 12 is illustrated by the curves in Figure 11. This figure is similar to Figure 5, except as modified by the stabilizing impedance, and corresponding lines are designated by like reference characters. The line 36 designates the value of the current flowing in the oscillating circuit. The line 25 indicates the by-pass current flowing through the stabilizing impedance or the winding 46 shunting the capacitor 21. The line 36a represents the current flowing through the capacitor 21, and is the difference between the curve 36 and the curve 25. The point 34 in Figure 11 represents the value of the current flowing in the oscillating circuit when the voltage is represented by the vertical distance between the points 30a and 31. The point 38 in Figure 11 represents the value of the current of the oscillating circuit at the instant the curves 26 and 27a cross at the point 32a.

Thus, for illustration, let it be assumed that the voltage of the supply source rises to a high value in which case a relatively large current would tend to rise in the oscillating circuit in proportion to the increase in the voltage rise. This increase in current is divided, part going through the capacitor 21 and the remainder going through the input winding 46 of the transformer 45. Because of the decreasing inductance characteristic of the stabilizing transformer 45, the higher the voltage impressed upon the input winding 46, the larger the current that tends to flow through the input winding 46 of the stabilizing transformer 45. In other words, the current flowing through the capacitor 21 always remains substantially at the same value, see line 36a, while the by-pass current flowing through the input winding of the stabilizing transformer 45 varied in proportion to the fluctuations of the voltage of the supply source, see line 25. As a result of this stabilizing action, taken in combination with the "jumping" phenomena of the oscillating circuit which gives sustained oscillations when the voltage of the supply source is above a certain value, the voltage across the output winding 47 of the transformer 45 remains substantially constant throughout wide fluctations of the voltage of the supply source.

Also the stabilizing transformer 45 functions to maintain the output voltage across the output winding 47 substantially constant throughout a relatively wide range of load conditions. Thus, when the load is removed or reduced, the voltage across the output winding 47 tends to increase. This increase in the voltage is not reflected across the capacitor 21, as the voltage across the capacitor remains substantially constant. Thus, the rising voltage due to a decrease in the load reduces the impedance of the stabilizing transformer, which in turn tends to reduce and limit the rising voltage and current from increasing beyond its normal stabilizing value.

I have also discovered that the voltage across the output winding 47 of the stabilizing transformer may be maintained substantially constant throughout a varying load by employing a load capacitor 48 in series with the output winding 47. It is found that as the load resistance is decreased, which would ordinarily cause the voltage across the output winding 47 to reduce, the voltage actually increases across the said output winding 47 as a result of the action of the capacitor 48. In other words, the capacitor 48 has a compounding action which produces under certain conditions a rise in the voltage instead of a decrease in the voltage when the load is increased.

A parasitic current may tend to flow through the closed circuit formed by the capacitor 21 and the winding 46 of the stabilizing transformer 45. For power work this may be objectionable, in which case it may be dampened by a resistor 64 connected in series with the closed circuit.

Summarizing, it may be stated that my invention in the form of an oscillating circuit, taken in combination with the stabilizing transformer, delivers a substantially constant output voltage for relatively wide variations of the voltage of the supply source or for relatively wide fluctuation in the load conditions.

In Figure 13, I show a modified form of a stabilizing transformer. Here the stabilizing transformer is indicated by the reference character 49 and has an intermediate primary tap 50, so as to impress a higher voltage upon the capacitor 21, than that of the supply source. In other words, the voltage impressed upon the capacitor 21 is equal to the voltage across the winding 51 plus the voltage across the winding 52 of the transformer 49. The output winding 53 of the transformer 49 is connected in circuit relation with the load and the capacitor 48 in the same manner as that shown in Figure 12. The transformer 49 in Figure 13 is so designed that the magnetic core thereof is normally operated near the knee of the saturation curve. The voltage-current characteristics of the operating elements of the oscillating circuit in Figure 13 may be obtained in the same manner as that previously described with reference to the oscillating circuit in Figure 12. The voltmeter and ammeter connection may be as that shown in Figure 7, and the general shape of the curves will correspond to those shown in Figures 10 and 11. Therefore, the operation of the arrangement shown in Figure 13 is the same as that previously described with reference to Figure 12 except that the voltage impressed upon the capacitor 21 is increased, which in turn increases the effective capacity of the capacitor 21. This means that a smaller size capacitor may be employed in the circuit of Figure 13 than in Figure 12.

In Figure 14, I show another arrangement for stabilizing the voltage across the capacitor 21. In this arrangement, I utilize a copper-oxide rectifier means, indicated by the reference character 62. In this embodiment of my invention, the rectifier means is of the full-wave type, and has an impedance which falls rapidly and non-linearly with increasing voltages. It is to be understood, however, that this rectifier means, as employed in this invention, does not rectify, but merely serves as an impedance with a non-linear characteristic. This means that as the voltage across the capacitor 21 tends to rise, a greater amount of the current is by-passed through the non-linear rectifier means. As a result, the voltage across the capacitor 21 is limited and stabilized at its normal operating value. The transformer 54 in Figure 14 may be operated as an ordinary transformer or it may be operated as a stabilizing transformer in which case the magnetic core thereof, is operated near the knee of the saturation curve. In the event that the transformer 54 is operated as an ordinary transformer, the stabilization is effected entirely by the non-linear rectifier means 62 except for the stabilizing action afforded by the capacitor 48. In the event that the transformer 54 is designed to have its magnetic core operated near the knee of the saturation curve, the stabilization is effected by both the stabilizing transformer 54 and the rectifier means 62. The windings of the transformer 54 are similar to those of the transformer 40 which has an intermediate primary tap 55 and input windings 56 and 57 which impress a relatively high voltage upon the capacitor 21. The output winding 58 is connected in circuit relation with the load and the capacitor 48 in the same manner as that shown in Figure 13. The voltage-current characteristics of the operating elements of the oscillating circuit in Figure 14 may be obtained in the same manner as that previously described with reference to the oscillating circuit in Figure 12. The voltmeter and ammeter connection may be as that shown in Figure 8, and the general shape of the curves will correspond to those shown in Figures 10 and 11.

In Figure 15, the stabilizing means is indicated by the reference character 63 and comprises a material having a non-linear voltage-current characteristic such that, as the voltage across the capacitor 21 increases, a larger proportion of the current passes through the stabilizing means 63. The composition of the material having the non-linear voltage-current characteristic and its physical dimensions are selected so that the voltage across the capacitor 21 is limited and stabilized at its normal operating value. The preparation and properties of the stabilizing material indicated by the reference character 63 are described in the United States Patent 1,822,742 granted to K. D. McEachron on September 8, 1931. In Figure 15, no transformer is employed, and the load is directly connected across the capacitor 21. The voltage-current characteristics of the operating elements of the oscillating circuit in Figure 15 may be obtained in the same manner as that previously described with reference to the oscillating circuit in Figure 12. The voltmeter and ammeter connection may be as that shown in Figure 9, and the general shape of the curves will correspond to those shown in Figures 10 and 11. The operation of the arrangement shown in Figure 15 is substantially the same as that previously described with reference to the other figures and is adapted to deliver a substantially constant output voltage for relatively wide variations of the voltage of the supply source.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An electrical system adapted to be energized by an alternating current supply source comprising, in combination, an oscillating circuit including a non-linear impedance and a capacitor adapted to be energized by the said supply source, said oscillating circuit being arranged to resonate at substantially the same frequency as the frequency of the supply source, and stabilizing transformer means shunting the capacitor and charging the capacitor at a higher voltage than the voltage of the said supply source, said stabilizing transformer means by-passing a portion of the oscillating current around the capacitor and having a decreasing inductance as the by-pass current rises above a certain value to limit and stabilize the voltage across the capacitor.

2. An electrical system adapted to be energized by an alternating current variable voltage supply source and arranged to deliver a substantially constant output voltage comprising, in combination, an oscillating circuit including a non-linear impedance and a capacitor adapted to be energized by the said supply source and arranged to resonate at substantially the same frequency as the frequency of the supply source, a stabilizing transformer means shunting the capacitor and by-passing a portion of the oscillating current around the capacitor, said stabilizing transformer means charging the capacitor at a higher voltage than the voltage of the said supply source and having a decreasing inductance as the by-pass current rises above a certain value to limit and stabilize the voltage across the capacitor, said stabilizing transformer means also having an output winding to deliver a substantially constant output voltage for relative wide variations of the voltage of the supply source.

3. An electrical system adapted to be energized by an alternating current variable voltage supply source and arranged to deliver a substantially constant output voltage comprising, in combination, an oscillating circuit including a non-linear impedance and a capacitor adapted to be energized by the said supply source and arranged to resonate at substantially the same frequency as the frequency of the supply source, a stabilizing transformer means shunting the capacitor and by-passing a portion of the oscillating current around the capacitor, said stabilizing transformer means charging the capacitor at a higher voltage than the voltage of the said supply source and having a decreasing inductance as the by-pass current rises above a certain value to limit and stabilize the voltage across the capacitor, said stabilizing transformer means also having an output winding to deliver a substantially constant output voltage for relative wide variations of the voltage of the supply source, and a load capacitor connected in series with the said output winding to stabilize further the output voltage with a varying load.

4. An electrical system adapted to be energized by an alternating current variable voltage supply source and arranged to deliver a substantially constant output voltage comprising, in combination, an oscillating circuit including a non-linear impedance and a capacitor adapted to be energized by the said supply source and arranged to resonate at substantially the same frequency as the frequency of the supply source, a non-linear rectifier stabilizing means shunting the capacitor to by-pass a portion of the oscillating current around the capacitor and to limit and stabilize the voltage across said capacitor, a transformer connected in shunt with the capacitor and having an output winding to deliver a substantially constant output voltage for relative wide variations of the voltage of the supply source.

5. An electrical system adapted to be energized by an alternating current variable voltage supply source and arranged to deliver a substantially constant output voltage comprising, in combination, an oscillating circuit including a non-linear impedance and a capacitor adapted to be energized by the said supply source and arranged to resonate at substantially the same frequency as the frequency of the supply source, a non-linear rectifier stabilizing means shunting the capacitor to by-pass a portion of the oscillating current around the capacitor and to limit and stabilize the voltage across said capacitor, a transformer connected in shunt with the capacitor and charging the capacitor at a higher voltage than the voltage of said supply source, said transformer having an output winding to deliver a substantially constant output voltage for relative wide variations of the voltage of the supply source.

6. An electrical system adapted to be energized by an alternating current variable voltage supply source and arranged to deliver a substantially constant output voltage comprising, in combination, an oscillating circuit including a non-linear impedance and a capacitor adapted to be energized by the said supply source and arranged to resonate at substantially the same frequency as the frequency of the supply source, a non-linear rectifier stabilizing means shunting the capacitor to by-pass a portion of the oscillating current around the capacitor and to limit and stabilize the voltage across said capacitor, a transformer connected in shunt with the capacitor and charging the capacitor at a higher voltage than the voltage of said supply source, said transformer having an output winding to deliver a substantially constant output voltage for relative wide variations of the voltage of the supply source, and a load capacitor connected in series with the said output winding to stabilize further the output voltage with a varying load.

7. An electrical system adapted to be energized by an alternating current variable voltage supply source and arranged to deliver a substantially constant output voltage comprising, in combination, an oscillating circuit including a non-linear impedance and a capacitor adapted to be energized by the said supply source and arranged to resonate at substantially the same frequency as the frequency of the supply source, stabilizing means shunting the capacitor to by-pass a portion of the oscillating current around the capacitor, said stabilizing means comprising a material having a non-linear voltage-current characteristic such that, as the voltage across the capacitor increases, a greater proportion of the current passes through the stabilizing means to limit and stabilize the voltage across the capacitor, a transformer connected in shunt with the capacitor and having an output winding to deliver a substantially constant output voltage for relative wide variations of the voltage of the supply source.

8. An electrical system adapted to be energized by an alternating current variable voltage supply source and arranged to deliver a substantially constant output voltage comprising, in combination, an oscillating circuit including a non-linear impedance and a capacitor adapted to be energized by the said supply source and arranged to resonate at substantially the same frequency as the frequency of the supply source, stabilizing means shunting the capacitor to by-pass a portion of the oscillating current around the capacitor, said stabilizing means comprising a material having a non-linear voltage-current characteristic such that, as the voltage across the capacitor increases, a greater proportion of the current passes through the stabilizing means to limit and stabilize the voltage across the capacitor, a transformer connected in shunt with the capacitor and having an output winding to deliver a substantially constant output voltage for relative wide variations of the voltage of the supply source, and a load capacitor connected in series with the said output winding to stabilize further the output voltage with a varying load.

9. An electrical system adapted to be energized by an alternating current variable voltage supply source and arranged to deliver a substantially constant output voltage comprising, in combination, an oscillating circuit including a non-linear impedance and a capacitor adapted to be energized by the said supply source and arranged to resonate at substantially the same frequency as the frequency of the supply source, stabilizing means shunting the capacitor to by-pass a portion of the oscillating current around the capacitor, said stabilizing means comprising a material having a non-linear voltage-current characteristic such that, as the voltage across the capacitor increases, a greater proportion of the current passes through the stabilizing means to limit and stabilize the voltage across the capacitor, a transformer connected in shunt with the capacitor and charging the capacitor at a higher voltage than the voltage of said supply source, said transformer having an output winding to deliver a substantially constant output voltage for relative wide variations of the voltage of the supply source.

10. An electrical system adapted to be energized by an alternating current variable voltage supply source and arranged to deliver a substantially constant output voltage comprising in combination, an oscillating circuit including a non-linear impedance and a capacitor adapted to be energized by the said supply source and arranged to resonate at substantially the same frequency as the frequency of the supply source, stabilizing means shunting the capacitor to by-pass a portion of the oscillating current around the capacitor, said stabilizing means comprising a material having a non-linear voltage-current characteristic such that, as the voltage across the capacitor increases, a greater proportion of the current passes through the stabilizing means to limit and stabilize the voltage across the capacitor, a transformer connected in shunt with the capacitor and charging the capacitor at a higher voltage than the voltage of said supply source, said transformer having an output winding to deliver a substantially constant output voltage for relative wide variations of the voltage of the supply source, and a load capacitor connected in series with the said output winding to stabilize further the output voltage with a varying load.

11. An electrical system adapted to be energized by an alternating current supply source comprising, in combination, an oscillating circuit including a non-linear inductance element and a capacitor adapted to be energized by the said supply source, said oscillating circuit being arranged to sustain oscillations at substantially the same frequency as the frequency of the supply source, and stabilizing transformer means shunting the capacitor to by-pass a portion of the oscillating current around the capacitor and charging the capacitor at a higher voltage than the voltage of said supply source, said stabilizing transformer means having a decreasing inductance as the by-pass current rises above a certain value to limit and stabilize the voltage across the capacitor, and resistance means in series with the closed circuit formed by the transformer means shunting the capacitor to dampen parasitic current flowing through the capacitor.

12. An electrical system adapted to deliver a substantially constant output voltage when energized by an alternating current variable voltage supply source, wherein the voltage may fluctuate throughout a range extending below and above its normal operation value, comprising, in combination, an oscillating circuit including a non-linear inductance element and a capacitor adapted to be energized by the supply source, stabilizing transformer means energized by the oscillating circuit and having an output winding to deliver a substantially constant output voltage, circuit connection means for connecting the non-linear inductance element and capacitor in series and the relationship between the said inductance element and the capacitor being so proportioned that upon the energization of the oscillating circuit by the supply source the oscillating circuit exhibits a sudden increase in the oscillating current before the supply voltage reaches the lower limit of the said fluctuating voltage range, thereby causing the variations of the supply voltage throughout the said fluctuating voltage range to become substantially ineffective in producing corresponding voltage variations in the output winding, circuit connection means for connecting the stabilizing transformer means across the capacitor and in series with the non-linear inductance element, said stabilizing transformer means having a decreasing inductance to limit and stabilize the voltage across the capacitor and to control the variation of inductance of said non-linear inductance element, said circuit connection means having such conductance that the said control of the variation of inductance of said non-linear inductance element results primarily from the decreasing inductance of said stabilizing transformer means, said stabilizing transformer means and the non-linear inductance element being connected in circuit relation with respect to each other so as to modify both halves of the alternating current wave in the same proportions.

13. An electrical system adapted to deliver a substantially constant output voltage when energized by an alternating current variable voltage supply source, wherein the voltage may fluctuate throughout a range extending below and above its normal operating value, comprising, in combination, an oscillating circuit including a non-linear inductance element and a capacitor connected in series and adapted to be energized by the supply source, stabilizing non-linear rectifier means shunting the capacitor to by-pass a portion of the oscillating current around, and to limit and stabilize the voltage across the capacitor, and output means connected in parallel with the capacitor to give a substantially constant output voltage as said supply voltage fluctuates throughout said fluctuating voltage range, the said inductance element and the capacitor being so proportioned that upon the energization of the oscillating circuit by the supply source the oscillating circuit exhibits a sudden increase in the oscillating current before the supply voltage reaches the lower limit of the said fluctuating voltage range, thereby causing the variations of the supply voltage throughout the said fluctuating voltage range to become substantially ineffective in producing corresponding voltage variations in the output means.

14. An electrical system adapted to deliver a substantially constant output voltage when energized by an alternating current variable voltage supply source, wherein the voltage may fluctuate throughout a range extending below and above its normal operating value, comprising, in combination, an oscillating circuit including a non-linear inductance element and a capacitor connected in series and adapted to be energized by the supply source, stabilizing means shunting the capacitor to by-pass a portion of the oscillating current around the capacitor, said stabilizing means comprising a material having a non-linear voltage-current characteristic such that, as the voltage across the capacitor increases, a greater proportion of the current passes through the stabilizing means to limit and stabilize the voltage across the capacitor, and output means connected in parallel with the capacitor to give a substantially constant output voltage as said supply voltage fluctuates throughout said fluctuating voltage range, the said inductance element and the capacitor being so proportioned that upon the energization of the oscillating circuit by the supply source the oscillating circuit exhibits a sudden increase in the oscillating current before the supply voltage reaches the lower limit of the said fluctuating voltage range, thereby causing the variations of the supply voltage throughout the said fluctuating voltage range to become substantially ineffective in producing corresponding voltage variations in the output means.

15. An electrical system adapted to deliver a substantially constant output voltage when energized by an alternating current variable voltage supply source, wherein the voltage may fluctuate throughout a range extending below and above its normal operation value, comprising, in combination, an oscillating circuit including a non-linear inductance element and a capacitor adapted to be energized by the supply source, stabilizing transformer means energized by the oscillating circuit and having an output winding to deliver a substantially constant output voltage, circuit connection means for connecting the non-linear inductance element and capacitor in series and the relationship between the said inductance element and the capacitor being so proportioned that upon the energization of the oscillating circuit by the supply source the oscillating circuit exhibits a sudden increase in the oscillating current before the supply voltage reaches the lower limit of the said fluctuating voltage range, thereby causing the variations of the supply voltage throughout the said fluctuating voltage range to become substantially ineffective in producing corresponding voltage variations in the output winding, circuit connection means for connecting the stabilizing transformer means across the capacitor and in series with the non-linear inductance element, said stabilizing transformer means having a decreasing inductance to limit and stabilize the voltage across the capacitor and to control the variation of inductance of said non-linear inductance element, said circuit connection means having such conductance that the said control of the variation of inductance of said non-linear inductance element results primarily from the decreasing inductance of said stabilizing transformer means, said stabilizing transformer means and the non-linear inductance element being connected in circuit relation with respect to each other so as to modify both halves of the alternating current wave in the same proportions, and a load capacitor connected in series with the said output winding to stabilize further the output voltage with a varying load.

16. An electrical system adapted to deliver a substantially constant output voltage when energized by an alternating current variable voltage supply source, wherein the voltage may fluctuate throughout a range extending below and above its normal operating value, comprising, in combination, an oscillating circuit including a non-linear inductance element and a capacitor connected in series and adapted to be energized by the supply source, a non-linear rectifier stabilizing means shunting the capacitor to by-pass a portion of the oscillating current around the capacitor and to limit and stabilize the voltage across said capacitor, a transformer connected in shunt with the capacitor and having an output means to deliver a substantially constant output voltage for relative wide variations of the voltage of the supply source, and a load capacitor connected in series with the said output means to stabilize further the output voltage with a varying load, the said inductance element and the capacitor being so proportioned that upon the energization of the oscillating circuit by the supply source the oscillating circuit exhibits a sudden increase in the oscillating current before the supply voltage reaches the lower limit of the said fluctuating voltage range, thereby causing the variations of the supply voltage throughout the said fluctuating voltage range to become substantially ineffective in producing corresponding voltage variations in the output means.

CLOSMAN P. STOCKER.